United States Patent [19]
Colombo et al.

[11] Patent Number: 5,605,646
[45] Date of Patent: Feb. 25, 1997

[54] CONTAINERS FOR PREPARATION AND DISPLAY OF FOODS

[75] Inventors: Edward A. Colombo, Penfield; Stephen L. Goulette, Newark, both of N.Y.

[73] Assignee: Tenneco Plastics Company, Evanston, Ill.

[21] Appl. No.: 305,911

[22] Filed: Sep. 15, 1994

[51] Int. Cl.[6] .................... B29C 33/12; B29C 33/38; A47J 37/01
[52] U.S. Cl. ............... 249/134; 249/57; 249/144; 249/160; 249/DIG. 1
[58] Field of Search ................... 249/117, 134, 249/160, DIG. 1, 57, 144; D9/429, 428, 418, 425; 220/23.86, 506

[56]  References Cited

U.S. PATENT DOCUMENTS

| | | | |
|---|---|---|---|
| D. 352,000 | 11/1994 | Hansen et al. | D9/429 |
| 692,919 | 2/1902 | Schaumloeffel | 249/DIG. 1 |
| 702,203 | 6/1902 | Haffner | 249/DIG. 1 |
| 1,505,999 | 8/1924 | Gereke | 249/DIG. 1 |
| 2,003,151 | 5/1935 | Lang | 249/DIG. 1 |
| 2,028,671 | 2/1936 | Kollman | 249/DIG. 1 |
| 3,179,036 | 4/1965 | Luken | 249/DIG. 1 |
| 3,252,683 | 5/1966 | Uetzmann | 249/DIG. 1 |
| 3,997,677 | 12/1976 | Hirsch et al. | 426/113 |
| 4,212,234 | 7/1980 | DeCourcy | 249/144 |
| 4,304,335 | 12/1981 | Bemiss | 206/607 |
| 4,505,962 | 3/1985 | Lu | 428/35 |
| 4,882,463 | 11/1989 | Kyougoku et al. | 219/10.55 E |
| 5,287,959 | 2/1994 | Hansen et al. | 206/45.32 |

*Primary Examiner*—Jan H. Silbaugh
*Assistant Examiner*—Mark Eashoo
*Attorney, Agent, or Firm*—Arnold, White & Durkee

[57] ABSTRACT

A domed container for the preparation and display of food includes a receptacle, a dome cover, and a hollow mold member. The receptacle has a bottom with a top surface and an outer circumference. The bottom possesses at least one groove in a closed, continuous pattern. The groove has two side surfaces and a bottom surface, and each side surface is configured to include projections extending into the groove. The dome cover includes a top wall having at least one wall depending therefrom. The depending wall has an outside surface and an inside surface. The container possesses a locking structure for releasably locking the cover to the receptacle. The hollow mold member, which forms a closed continuous pattern, has a lower edge that fits into the groove of the receptacle and is held in place from each side by an interference fit between the projections of the side surfaces of the groove and the lower edge, thereby removably attaching the hollow mold member perpendicularly to the receptacle.

27 Claims, 5 Drawing Sheets

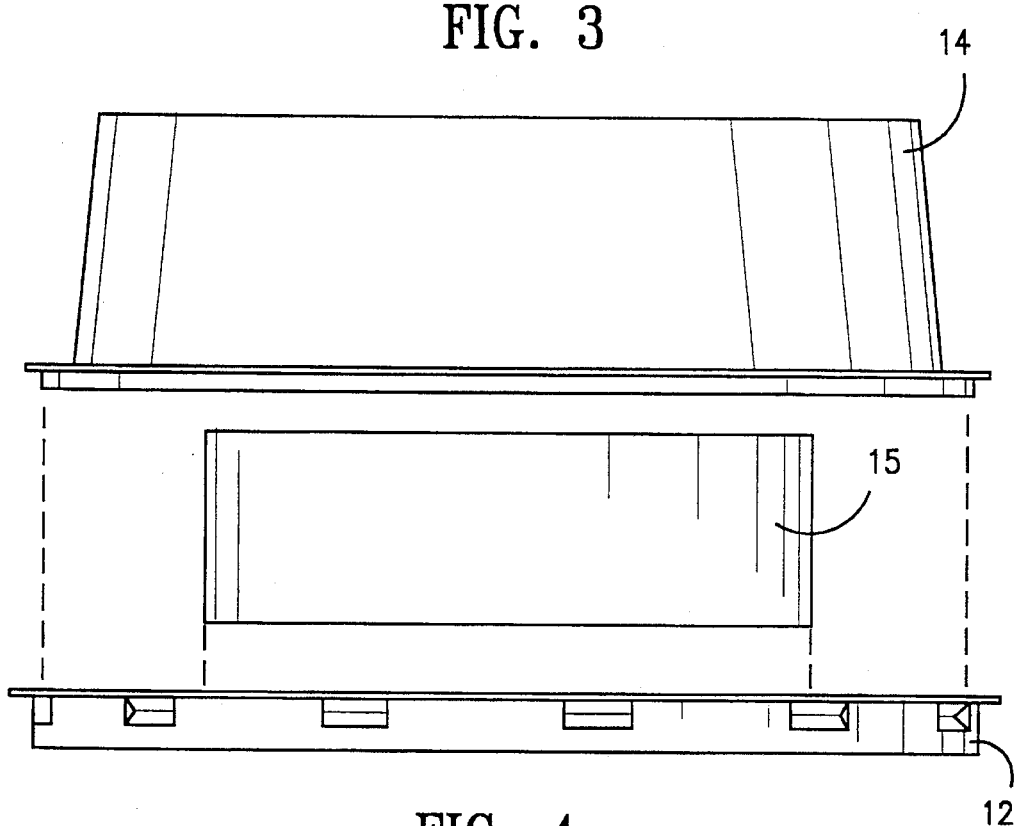
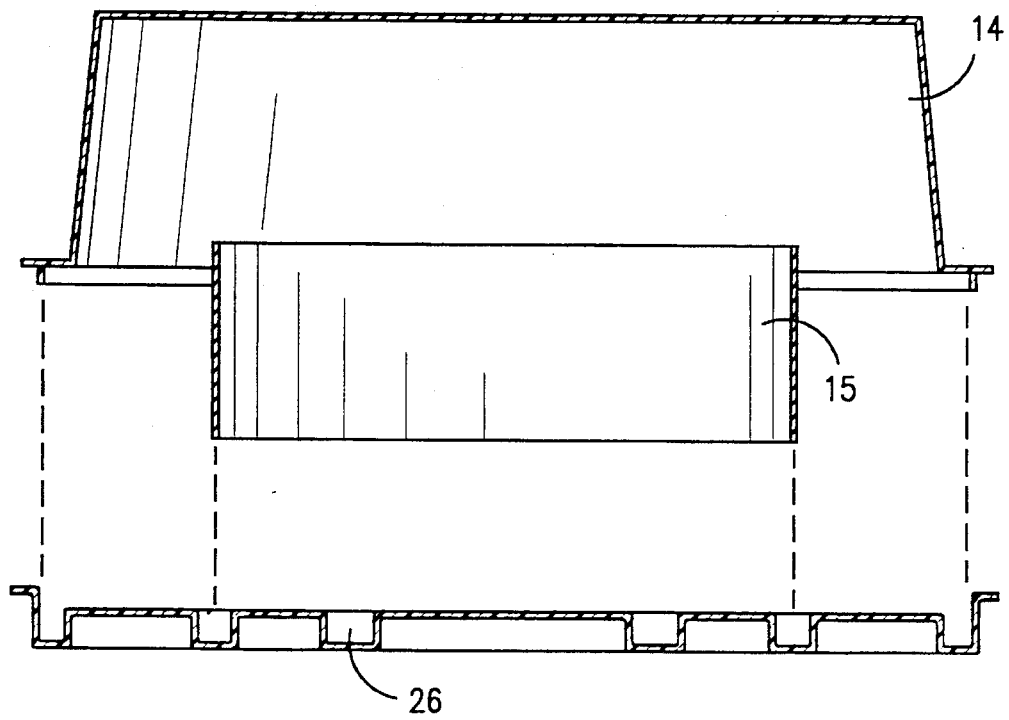

CONTAINERS FOR PREPARATION AND DISPLAY OF FOODS

FIELD OF THE INVENTION

This invention relates to disposable containers preferably having domed covers and more particularly, to a relatively thin-walled, thermoformed domed container for preparation, packaging and displaying the food product placed within it.

BACKGROUND OF THE INVENTION

In the retail merchandising of cakes, pastries, etc., it is a common practice to package such items in containers which protect the entire item from contamination. Usually, the baked or frozen good is placed on a plate or dish constructed of foil, paper or fiberboard and placed in a container such as a cardboard box.

The overall appearance of a particular product often provides the motivation necessary for the consumer to purchase it. In today's competitive marketplace, products fairly equivalent in quality are positioned side-by-side on the retailer's shelf. If the appearance of the container is pleasing or if there is some utility or additional feature which the container provides, it often induces the consumer to purchase the item so packaged.

In the past at least two methods have been used to prepare and then display foods such as pastries and cakes. The predominate method involves placing raw ingredients in metal containers such as bakeware and baking these ingredients in an oven. The final baked product is then removed from a reusable metal container and placed into a display package or case. A non-reusable metal container, such as thin aluminum bake ware, may be used for display of foods for sale. Although baking is the primary method of preparation described in this invention, it is to be understood that preparation may involve freezing or refrigeration of foods such as ice cream dishes, "ice-box" pies, or no-bake cheesecakes.

In the case of reusable, or permanent type metal bake ware, a "spring-form" pan may be employed. This apparatus comprises a metal base (or receptacle) and a circular preformed metal band which attaches to the base and becomes the sidewall of the container. After baking the "spring-form" band is removed and the final baked product is taken from the container, optionally decorated, then packaged. Reusable bake ware requires substantial effort to clean and condition the container to prepare for the next use.

A large number of containers have been developed for the producers and distributors of food. A domed container for the display of baked goods is disclosed in U.S. Pat. No. 5,287,959. This container comprises a domed cover and a receptacle, but it is not intended for use in the preparation of food. It is intended for display only. The cover of this invention possess a series of ribs for reinforcement, which is not a feature of the instant invention. The container is preferably composed of thermoformed plastic.

U.S. Pat. No. 4,505,962 discloses microwavable thermoplastic containers, but they are not intended for display of food after preparation. They are designed for microwave heating in the presence of hot fat.

U.S. Pat. No. 4,882,463 discloses a microwavable container for baking bread, which contains a dielectric material. This container is preferably constructed of paperboard. There is no means to display the product after it is prepared.

U.S. Pat. No. 4,304,335 discloses a tray composed of paperboard which can be used for baking in a conventional oven. It is not designed for display of food items, however.

U.S. Pat. No. 3,997,677 discloses a high temperature resistant hermetically sealed plastic tray which can be used for freezing, heating and serving a food item. It is not intended to display food items for sale.

Thermoset and heat resistant plastics have recently entered the bake ware category, as some of the examples of prior art listed above indicate. They have been primarily designed for baking applications in the home, involving pre-mixed and, optionally frozen unbaked products. Some of these containers have been used commercially for bake-in and display packaging today, as in the case of dual oven bakery trays. Raw ingredients may be baked in the same container which is used for display of the final product.

SUMMARY OF THE INVENTION

The bake-in and display container of this invention, preferably formed of molded heat resistant thermoplastic materials, permits the baking and display of single layer pastries, cakes etc which require that the sides of the final product be visible and, optionally, accessible for decoration. The heating method is preferably a convection oven, although a microwave oven maybe used in some recipes. The container permits the food item to be prepared in the form of a torus, i.e., in a doughnut or ring shape. This is desirable in the preparation of coffee cakes, breads, kuchens, etc. The container of this invention offers a unique method of baking food items using a receptacle (base) and either just an outside ring (or form, if a shape other than circular is used) or a combination of concentric rings or forms. The single ring, or form, may be used for layer cakes, cinnamon buns, and no-bake cheesecakes. The receptacle (base), ring or form, and cover are all preferably composed of thermoplastic materials, although non-plastic materials such as coated paperboard may be used for applications requiring freezing or refrigeration rather than heating. The receptacle possesses one or more downwardly projecting grooves which create a closed pattern, or shape. The pattern is preferably circular, but may be in other configurations, such as rectangles, triangles, heart-shapes, etc. The width and depth of each groove is designed to accommodate the ring or form by means of an interference fit. Projections along each side of the groove create the interference fit. Unused grooves or other projections in the base may be used to secure the final product to the base by permitting the product to bake into or around the grooves and projections. Slippage and movement is thus restricted during handling. The lid is attached to the base by a locking means. The preferred means includes a periphery groove around the base, in which the lid fits. The lid is held in place by a series of projections, or latches, extending inward from the external wall of the periphery groove. The lid is usually formed in a domed shape, but may be made in a variety of heights in order to accommodate different products.

The final product remains on the base. The rings or forms may remain in place or be removed. The lid is then put in place and the container displayed at the point of sale. The container of this invention eliminates the steps of removing the product from the container in which it was baked, and the cleaning and conditioning associated with reusable bake ware. The display container itself may be formed in a variety of geometric shapes, although the round shape of FIG. 1 is preferred.

The use of molded thermoplastic baking containers may potentially reduce costs by limiting the investment in reusable bake ware, thereby reducing inventories of bake ware and packaging and lowering associated labor costs. The need for cake boards is also eliminated.

BRIEF DESCRIPTION OF THE DRAWINGS

The actual construction, configuration, and advantages of the present invention will be better understood by referring to the following drawings in which like numerals identify like elements and in which:

FIGS. 3 and 4 are exploded views of the preferred embodiment of the instant invention, showing the relationship of the cover, the ring mold, and the receptacle. FIG. 3 illustrates the relationship of the three pieces in side view. FIG. 4 provides a cross-sectional view of the cover, the ring mold, and the receptacle, illustrating the relationship of the ring mold to the grooves in the receptacle.

DETAILED DESCRIPTION OF THE INVENTION

Figure 1:
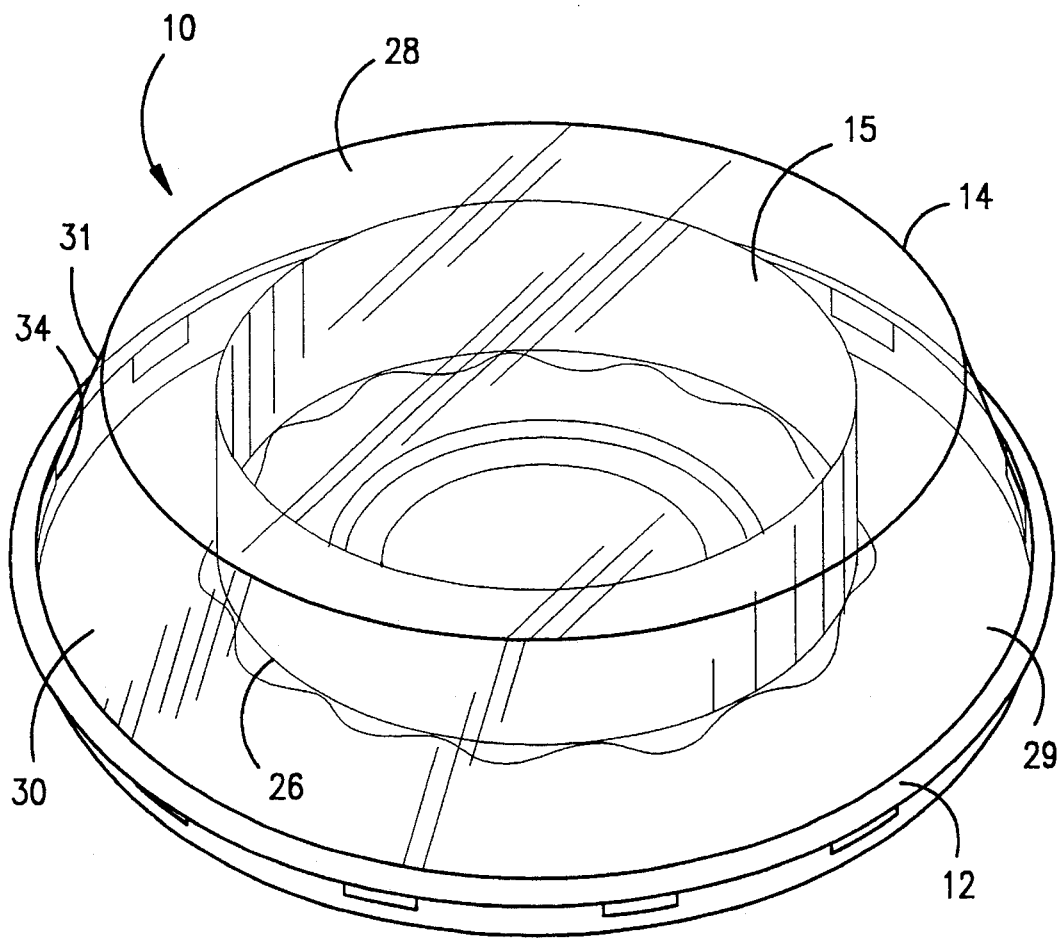
FIG. 1 is a perspective view of the cover of the preferred embodiment of the instant invention, illustrating also the receptacle and ring mold.

The present invention is best understood by reference to the appended figures, which are given by way of example and not of limitation. Referring now to FIG. 1, a perspective view of a preferred embodiment of a domed container 10 for preparing, packaging and displaying a food product is shown in a closed condition. The food container 10 includes a receptacle 12 and a domed cover 14. FIG. 1 also illustrates a ring member 15 fitting perpendicularly by means of an interference fit in a groove 26 of receptacle 12. The interference fit is created from sinuous projections which extend into the groove from each side. The ring member is held in place by friction between the ring member and the projections touching it on either side. The projections from one side are offset from those on the other side by 90°.

Figure 2:
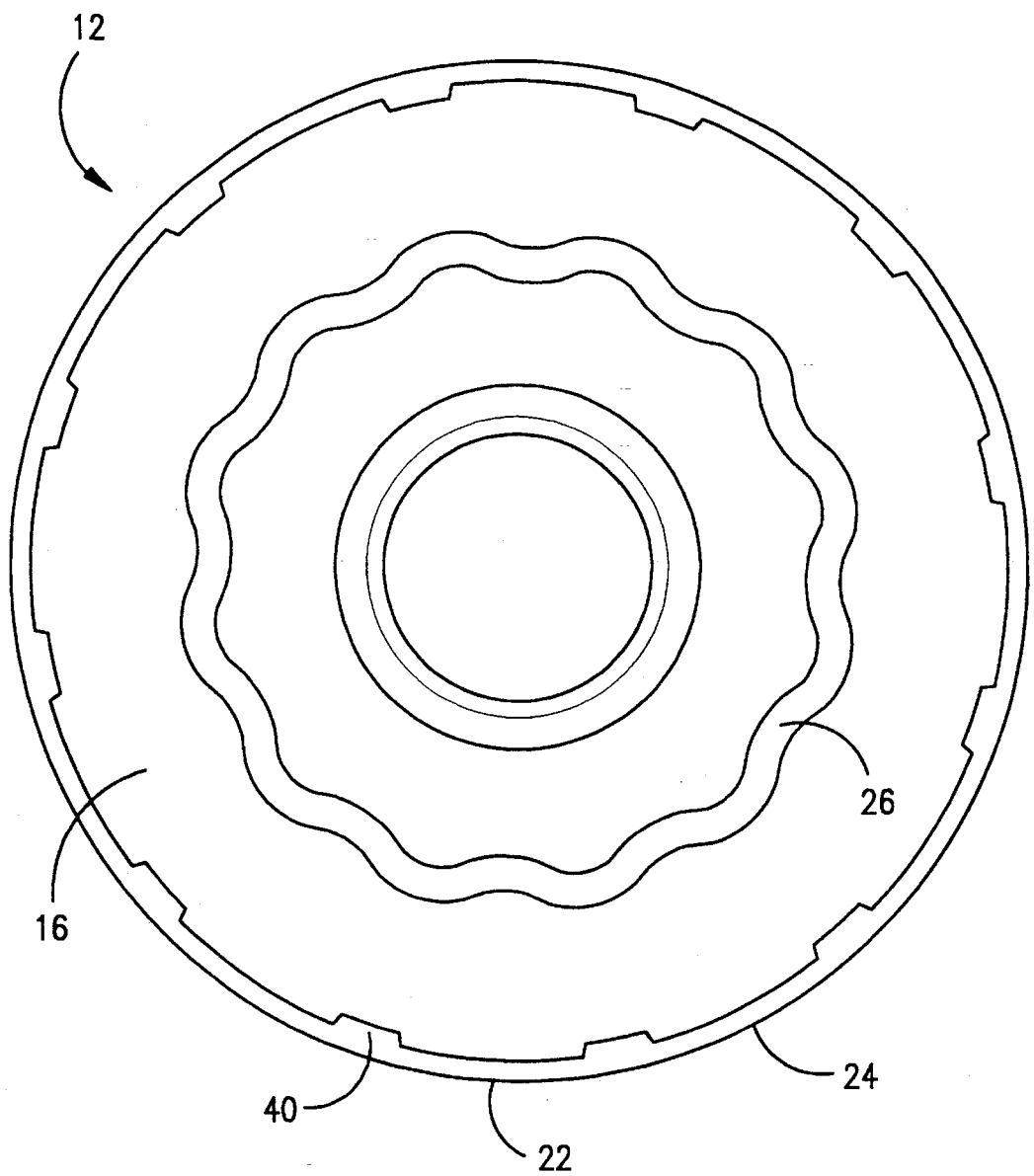
FIG. 2 is a detailed illustration of the top surface of the receptacle of the preferred embodiment of this invention, showing the sinuous, patterned grooves designed to hold a ring in place by a friction, or interference, fit.
Figure 5:
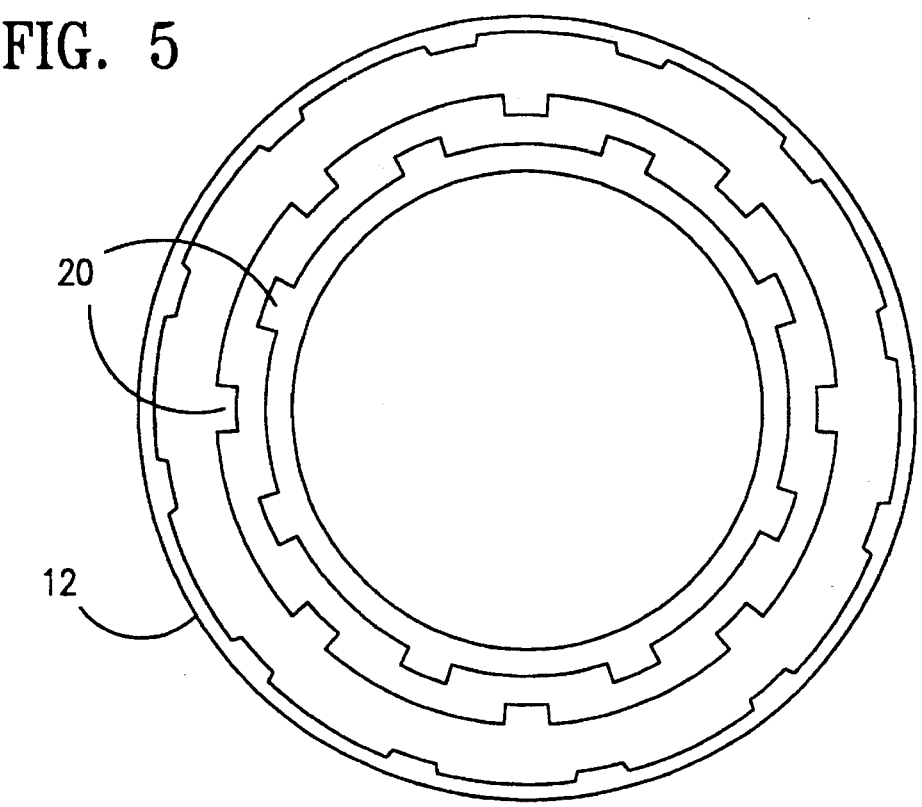
FIGS. 5 and 6 illustrate various patterns of grooves which may also be used to produce an interference fit. A ring mold is also used in FIGS. 5 and 6. Although not illustrated, other closed patterns, such as triangular and rectangular, may be used. Instead of a ring, a form is used in the shape of the groove pattern.
Figure 6:
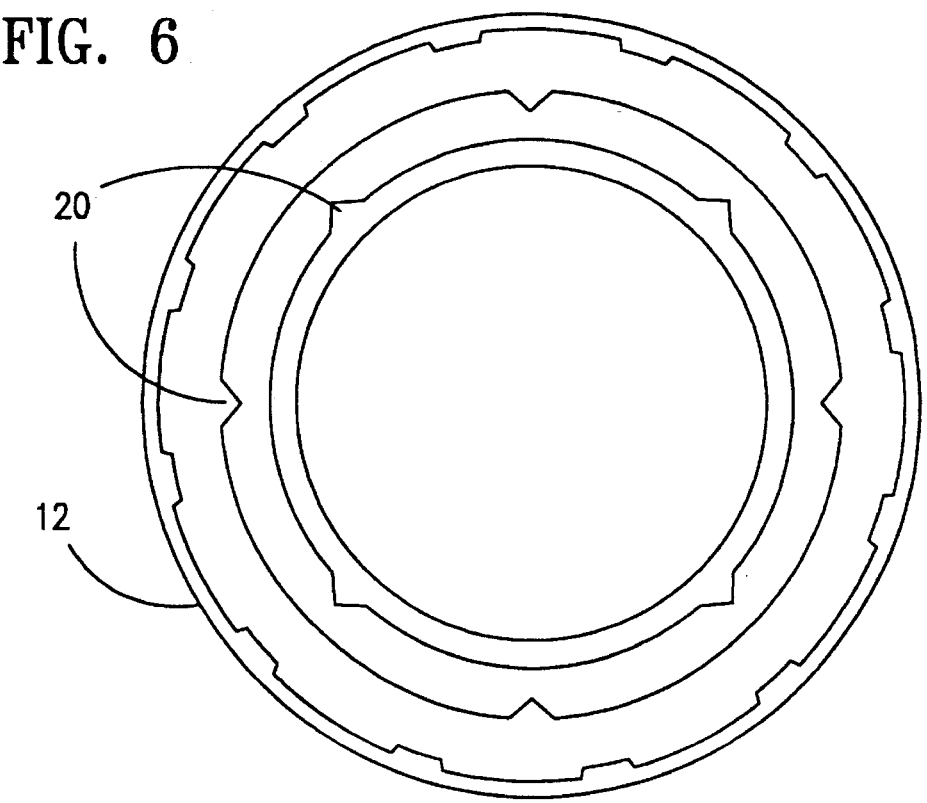
Figure 7:
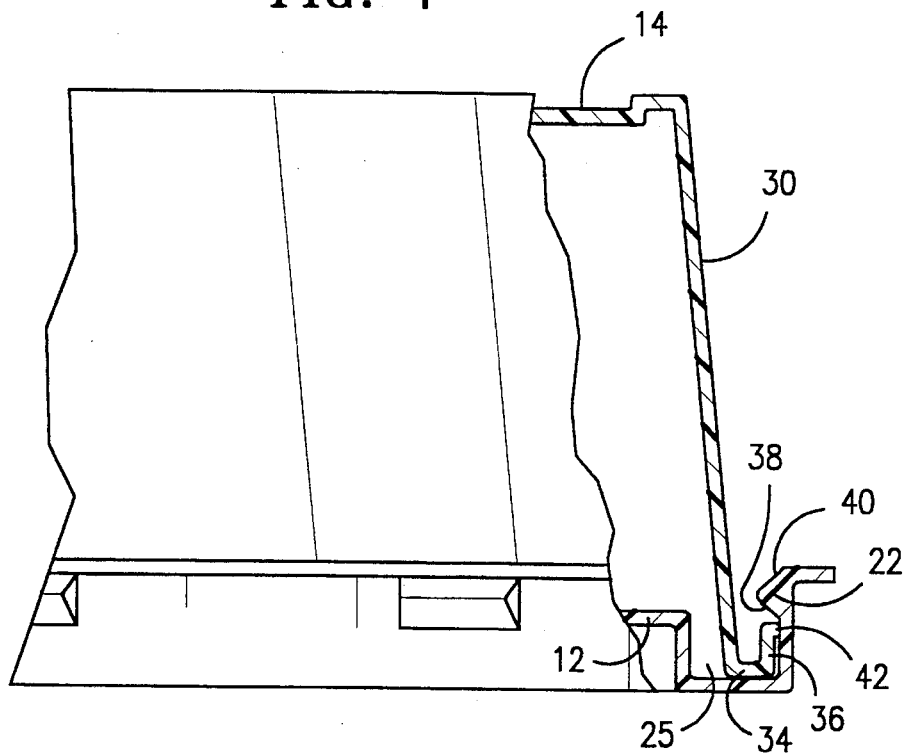
FIG. 7 illustrates the preferred locking means between the cover and the receptacle.

Referring also to FIG. 2, in which a top view of the receptacle 12 of FIG. 1 is presented, receptacle 12 is shown to include a bottom 16 (wherein the top surface of the bottom is shown) and terminating in an outwardly extending resilient rim 22. FIG. 7 details the preferred locking means of the instant invention. The outwardly extending resilient rim 22 is capable of yielding radially when dome cover 14 is being installed. Bottom 16 of receptacle 12 has a bottom surface 24 (see FIG. 2) which includes one or more depending groove structures 26, which extend below the bottoms of the rim 22. Each groove structure creates a closed pattern, or shape. The pattern is preferably sinuous, accommodating a circular ring, (see FIG. 2) but may be in other configurations, such as rectangles and triangles. The width and depth of each groove is designed to accommodate the ring or form, which fits perpendicularly in the groove by means of an interference fit. Projections 20 along each side of the groove create the interference fit. FIG. 2 illustrates the preferred embodiment, sinuous projections, wherein the projections from one side of the groove are offset from the projections of the other side of the groove by 90°. FIGS. 5 and 6, also showing receptacle 12, illustrate other patterns of projections 20 which can create an interference fit for a circular ring.

FIG. 3 illustrates the relationship between the dome cover 14, the ring mold 15 and the receptacle 12 when viewed from the side. FIG. 4 shows the dome cover 14, the ring mold 15 and the receptacle 12 in cross-section, illustrating how the ring mold is held in the center of the groove 26.

The preferred method of using the dome container 10 is described below. Batter, cake mix or an unbaked pastry dough is poured into the area within the ring mold 15, which is held perpendicular to the receptacle 12 by an interference fit. The batter, ring mold 15 and receptacle 12 are placed in an oven for baking. After baking the ring mold 15 may be removed or it may remain in place. Toppings may be added to the baked product. If the ring mold 15 is removed, the product may be decorated on the sides. The domed cover 10 is then locked onto the product. Instead of being prepared by baking the product may alternately be prepared by refrigeration, also utilizing the ring mold 15 and the receptacle 12. Refrigeration is generally used if the product is a cheesecake, ice cream product or icebox pie.

Referring to FIG. 1, it may be seen that dome cover 14 includes a top wall 28 having at least one wall 30 which depends therefrom. Wall 30 possesses an inside surface 29 and outside surface 31. A stacking recess (not shown) may be present on the outside surface 31 of the depending wall of the cover, thereby permitting the inside wall 29 of another cover to rest therein in a stacked relation. FIG. 7 shows that depending wall 30 also has a lower end 34 adapted to be received in the slot 25 formed in the top surface of bottom 16. Slot 25 extends around the outer circumference of receptacle 12. The bottom 16 of the receptacle terminates in rim 22 of receptacle 12, thereby forming the external wall of slot 25. Lower end 34 of depending wall 30 terminates in an outwardly extending resilient flange 36. FIG. 7 is an enlarged, fragmentary view of the FIG. 1 embodiment. It is depicted in partial cross-section in order to show the locking means particularly preferred in the practice of the present invention. Rim 22 is provided with an inwardly extending shoulder 38 and a first camming surface 40 formed on rim 22 (see also FIG. 2) and extending outwardly and upwardly from shoulder 38. Outwardly extending resilient flange 36 also includes a second camming surface 42 formed on the exterior of flange 36.

When seeking to close the domed container of the instant invention, as dome cover 14 is moved towards receptacle 12 in order to effect a locking engagement therewith, the first camming surface 40 of receptacle 12 and the second camming surface 42 of dome cover 14 initially co-act with one another causing rim 22 to be deformed outwardly, radially and downwardly, with the outwardly extending flange 36 to be deformed inwardly towards lower end 34 of depending wall 30, while the latter is substantially reinforced by the internal wall of slot 25 of receptacle 12 until flange 36 abuttingly engages the underside of the shoulder 38. The locking means herein described provides a secure locking feature without the exertion of highly localized stresses on the relatively thin-walled dome cover or receptacle during container closure.

Figure 8:
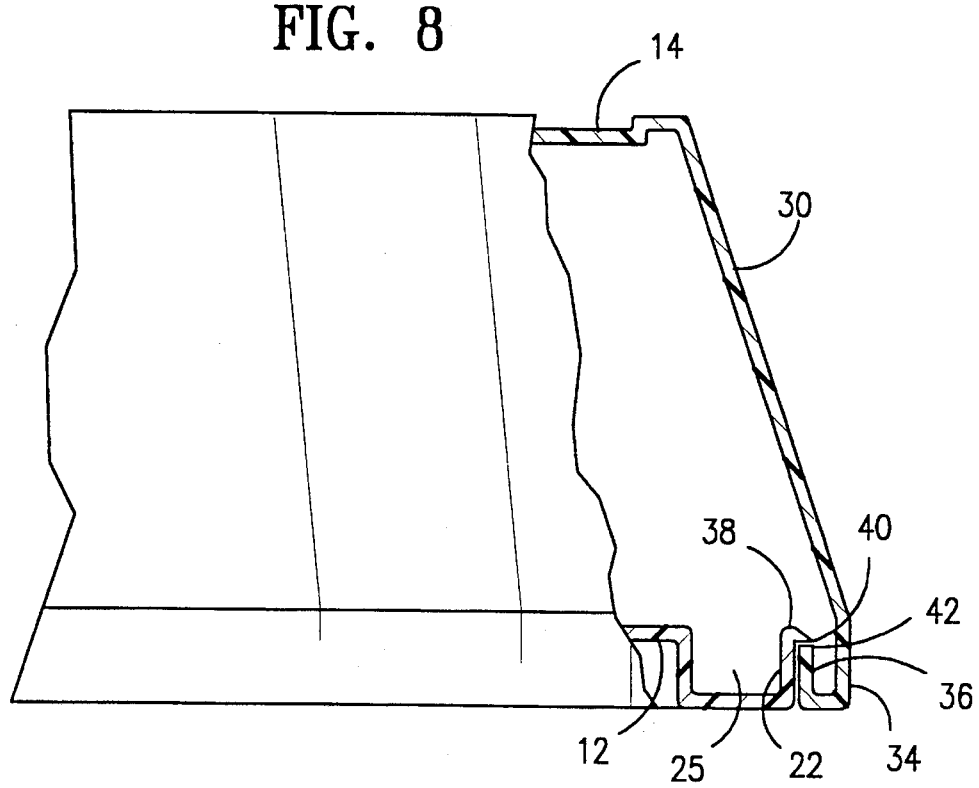
FIG. 8 illustrates an alternate locking means.

FIG. 8 illustrates an alternate locking means, in which the domed cover 14 fits over the receptacle 12 rather than within it. In this embodiment, the depending wall 30 of the domed container 14 possesses a lower end 34 which is adapted to fit over the rim 22 of receptacle 12. The lower end 34 of the depending wall 30 terminates in an inwardly extending resilient flange 36. Rim 22 of receptacle 12 is provided with an outwardly extending shoulder 38 and a first camming surface 40 formed on rim 22 and extending inwardly and upwardly from shoulder 38. Inwardly extending resilient flange 36 also includes a second camming surface 42 formed on the interior of flange 36.

When seeking to close the domed container of the instant invention, (see FIG. 8) as dome cover 14 is moved toward receptacle 12 in order to effect a locking engagement therewith, the first camming surface 40 of receptacle 12 and the second camming surface 42 of dome cover 14 initially co-act with one another causing rim 22 to be deformed inwardly, radially and downwardly, with the inwardly extending flange 36 being deformed outwardly towards lower end 34 of depending wall 30. Rim 22 is substantially reinforced by the internal wall of slot 25 of receptacle 12 until flange 36 abuttingly engages the underside of the shoulder 38.

As can be appreciated, it is within the scope of the present invention to modify the shape of the receptacle 12 in order to accommodate any of a number of foods which would benefit from the use of the inventive concept disclosed herein. Modification to the cover 14 in order to achieve the same purpose is also within the scope of the present invention, as those skilled in the art would readily recognize.

It is preferred that the domed container 10 of the invention (FIG. 1) be made of a thin gauge synthetic thermoplastic such as biaxially oriented transparent polystyrene (OPS), amorphous polyethylene terephthalate (APET), crystalline polyethylene terephthalate (CPET) and talc-filled polypropylene. When the preferred thermoplastic materials are employed, a gauge thickness of from about 8 to about 14 mils is known to provide suitable performance. As those skilled in the art recognize, other clear or opaque plastics having the requisite strength and ease of processing may also be employed.

It is to be understood that the containers of the present invention may assume a wide variety of shapes as necessitated by the particular application to be practiced.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A domed container for the preparation and display of food, the container comprising:

(i) a receptacle having a bottom with a top surface and an outer circumference, which bottom possesses at least one groove in a closed, continuous pattern, said groove having two side surfaces and a bottom surface, each side surface configured to include projections extending into said groove;

(ii) a dome cover which comprises a top wall having at least one wall depending therefrom, the depending wall having an outside surface and an inside surface, the container possessing a locking means for releasably locking the cover to the receptacle; and (ii) at least one hollow mold member having a lower edge, wherein the hollow mold member forms a closed continuous pattern, the lower edge of the hollow mold member fitting into said groove of the receptacle and being held in place from each side by an interference fit between the projections of the side surfaces of said groove and the lower edge, thereby removably attaching the hollow mold member perpendicularly to the receptacle.

2. The container of claim 1, wherein the hollow mold member is in the pattern of a ring.

3. The container of claim 2, wherein the side surfaces of the groove are formed by two closed, continuous concentric sinuous wave patterns, thereby creating a plurality of identical projections into the groove from each side, a projection from one side of the groove being offset by the projection from the other side of the groove by 90° wherein the lower edge of the hollow mold member fits securely, by means of the interference fit.

4. The container of claim 3, wherein the cover, hollow mold member, and receptacle are manufactured by thermoforming a sheet of thermoplastic material.

5. The container of claim 1, wherein the locking means comprises a slot in the top surface of the bottom which extends along the outer circumference of the receptacle and has an internal wall and an external wall, the bottom of the receptacle terminating in an outwardly extending resilient rim wherein the rim is radially yieldable, the rim having an inwardly extending shoulder and a first camming surface extending outwardly and upwardly from the shoulder, the locking means further comprising a lower end of the depending wall which is adapted to be received in the slot, the lower end of the depending wall terminating in an outwardly extending resilient flange adapted to underlie the shoulder in abutting locking engagement therewith, thereby preventing movement of the cover relative to the receptacle, and a second camming surface formed on an exterior of the flange; movement of the cover towards the receptacle to effect locking engagement therewith causing the first and second canning surfaces to initially co-act with one another and causing the rim to be deformed outwardly and the flange of the cover to be deformed inwardly toward the lower end of the depending wall of the cover while the cover is substantially reinforced by the internal wall of the slot, until the flange abuttingly engages the underside of the shoulder.

6. The container of claim 1, wherein the locking means comprises a slot in the top surface of the bottom which extends along the outer circumference of the receptacle and has an internal wall and an external wall, the bottom of the receptacle terminating in an inwardly extending resilient rim wherein the rim is radially yieldable, and is formed by an extension of the external wall of the slot, the rim having an outwardly extending shoulder and a first camming surface extending inwardly and upwardly from the shoulder, the locking means further comprising the lower end of the depending wall which is adapted to be received in the slot the lower end of the depending wall terminating in an inwardly extending resilient flange adapted to underlie the shoulder of the rim in abutting locking engagement therewith, thereby preventing movement of the cover relative to the receptacle, and a second camming surface on an interior of the flange, the first and second camming surfaces initially co-acting with one another, causing the rim to be deformed inwardly and downwardly and the flange of the cover to be deformed outwardly toward the lower end of the depending wall of the cover, while the rim is substantially reinforced by the internal wall of the slot, until the flange abuttingly engages the underside of the shoulder.

7. The container of claim 1, wherein the cover is manufactured by thermoforming a sheet of thermoplastic material.

8. The container of claim 7, wherein the sheet of thermoplastic material is selected from the group consisting of biaxially oriented polystyrene, amorphous polyethylene terephthalate, crystalline polyethylene terephthalate and talc-filled polypropylene.

9. The container of claim 8, wherein the sheet of thermoplastic material is transparent.

10. The container of claim 9, wherein said sheet of thermoplastic material has a gauge thickness of from about 8 mils to about 14 mils.

11. The container of claim 1, wherein the receptacle, cover and hollow mold member are all formed of paperboard.

12. The container of claim 1, wherein the receptacle is manufactured by thermoforming a sheet of thermoplastic material.

13. The container of claim 12, wherein the sheet of thermoplastic material is selected from the group consisting of biaxially oriented polystyrene, amorphous polyethylene terephthalate, crystalline polyethylene terephthalate and talc-filled polypropylene.

14. The container of claim 12, wherein the sheet of thermoplastic material has a gauge thickness of from about 8 mils to about 14 mils.

15. The container of claim 12, wherein the sheet of thermoplastic material is transparent.

16. The container of claim 1, wherein the cover further comprises a stacking recess located on the outside surface of the depending wall of the cover, thereby permitting the inside wall of another cover to nest therein in a stacked relation.

17. The container of claim 1, wherein the hollow member is manufactured by thermoforming a sheet of thermoplastic material.

18. The container of claim 17, wherein the sheet of thermoplastic material is selected from the group consisting of biaxially oriented polystyrene, amorphous polyethylene terephthalate, crystalline polyethylene terephthalate and talc-filled polypropylene.

19. The container of claim 17, wherein the sheet of thermoplastic material has a gauge thickness of from about 8 mils to about 14 mils.

20. The container of claim 1, wherein the receptacle possesses a plurality of grooves which are placed concentrically in the bottom.

21. The container of claim 1, wherein the side surfaces of the groove are formed by two closed, continuous, concentric patterns, each side surface having a plurality of identical projections, equidistant from one another, which extend into the groove, the design of each projection on one side surface being identical to the design of each projection on the other side surface, wherein the projections on one side surface alternate with those on the other side surface, each projection from one side surface being offset from the nearest projection on the other side surface, thereby molding the lower edge of the hollow mold member securely in the groove by the interference fit.

22. The container of claim 21, wherein the closed, continuous pattern formed by each side surface of the groove is a geometric shape, the two surfaces together creating a concentric pattern.

23. The container of claim 22, wherein the geometric shape of the groove is selected from the group consisting of a circle, a square, a triangle, and a rectangle.

24. The container of claim 21, wherein the hollow mold member possesses a geometric shape other than a ring.

25. The container of claim 24, wherein the geometric shape of the hollow mold member is selected from the group consisting of a square, a triangle, and a rectangle.

26. The container of claim 21, wherein the identical projections are notches of geometric shape.

27. The container of claim 26, wherein the identical projections are notches selected from the group consisting of a triangle and a square.

* * * * *